United States Patent [19]

Lutts et al.

[11] 3,756,587

[45] Sept. 4, 1973

[54] FABRIC PICK-UP MECHANISM

[75] Inventors: Carlton G. Lutts; John W. Brennan, both of Salem, Mass.

[73] Assignee: USM Corporation, Boston, Mass.

[22] Filed: Dec. 23, 1971

[21] Appl. No.: 211,547

[52] U.S. Cl. .................................. 271/20, 271/21
[51] Int. Cl. ........................... B65h 3/08, B65h 3/22
[58] Field of Search ................... 271/20, 26, 21, 22, 271/14, 16, 19, 23, 25, 27, 28, 30

[56] References Cited
UNITED STATES PATENTS

| 3,608,890 | 9/1971 | Littlefield | 271/21 |
| 3,430,949 | 3/1969 | Herdeg et al. | 271/26 R X |
| 3,595,562 | 7/1971 | Oldroyd et al. | 271/26 R |
| 2,003,698 | 6/1935 | Remington | 271/25 |
| 1,155,999 | 10/1915 | Edwards et al. | 271/20 |

FOREIGN PATENTS OR APPLICATIONS 628,696   11/1961   Italy ..................................... 271/20

*Primary Examiner*—Evon C. Blunk
*Assistant Examiner*—Bruce H. Stoner, Jr.
*Attorney*—Richard B. Megley, Carl E. Johnson et al.

[57] ABSTRACT

A versatile mechanism is provided for successively seizing and removing single plies of fabric and the like. A pair of pick-up devices, employing suction holding and friction separating means and without the aid of a hold-down mechanism, cooperate to locally contort and separate a ply from its stack by relative offset pivotal movement whereupon the devices can reliably transfer the single separated work piece.

5 Claims, 5 Drawing Figures

PATENTED SEP 4 1973

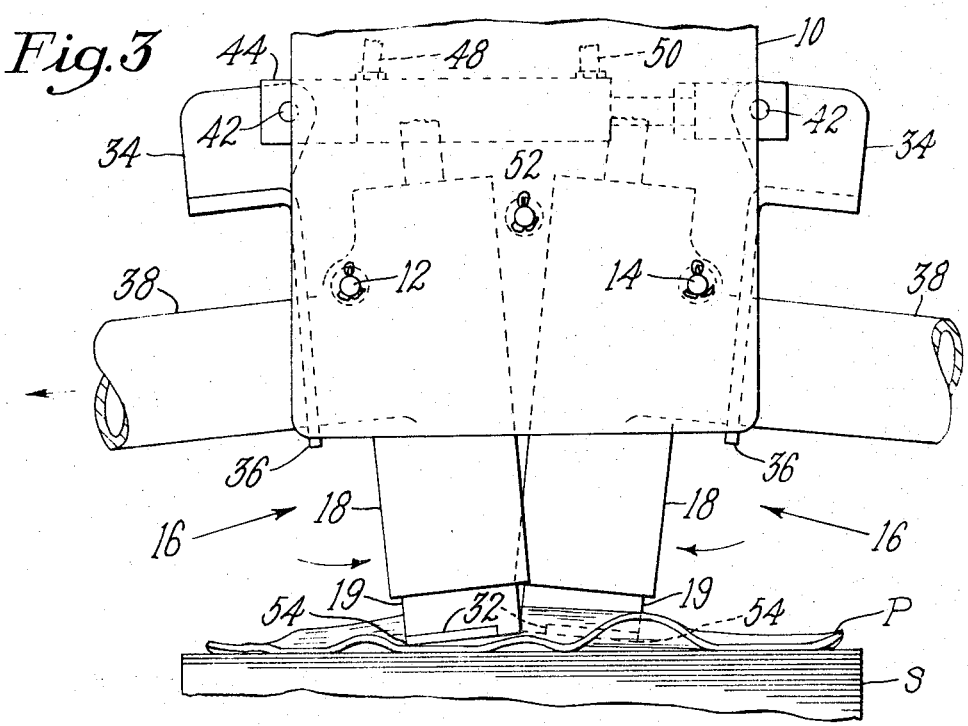
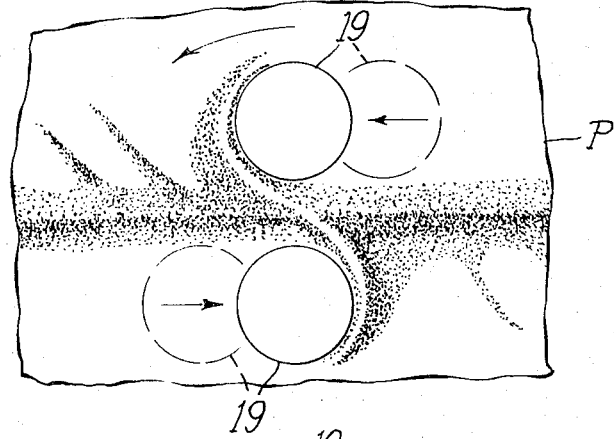
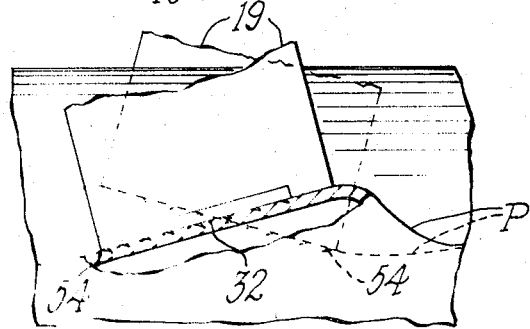

3,756,587

FABRIC PICK-UP MECHANISM

BACKGROUND OF THE INVENTION

This invention relates to a mechanism for picking up flexible sheet material to be transferred to a predetermined position.

More particularly, the invention is concerned with providing an improved automatic pick-up device capable of transferring each top-most ply of fabric or the like from a stack. In the garment and apparel trades, for instance, considerable effort is being expended to relieve operators of much of the drudgery accompanying manual, repetitive handling of sheet-like work pieces in various assembly, operating and treatment stations. Many designs of pick-up devices have hitherto been provided, and some operate with fairly consistent results on certain types of fabric. They have employed lift off suction in some instances, and in others employed buckling members and frictional or pointed work engaging elements operable in different ways. Unfortunately, known pick-up devices often have one or more of the following unwanted tendencies: (1) picking up no work piece or two or more work pieces simultaneously; (2) damaging or marring the fabric picked up; (3) dropping the seized work piece at other than the desired locality; and (4) disturbing the underlying work piece of a stack thereby preventing subsequent precise transfer to the desired locality.

SUMMARY OF THE INVENTION

In view of the foregoing it is an object of this invention to provide in a sheet transfer machine an improved pick-up mechanism of simple construction which shall be capable of removing single plies of fabric and the like, and be effective on a great variety of sheet material without danger of damaging.

To the end stated, a feature of the invention resides in the provision of a pair of cooperative, pivotally mounted pick-up devices, the devices being operative in offset planes and initially spaced apart and then movable relatively together while frictionally engaging and lifting the work piece to be transferred. The work engaging ends of the devices may be tubular continuously to exert suction and provided with a high friction means or a yieldable pointed means which do not appreciably penetrate the work surface. Accordingly, the fulcra of the devices being respectively offset and parallel to the top of the stack, movement together of the pick-up devices contorts a locality of only the top sheet, effecting its separation from the plane of an under ply. The tendency, if any, of the second ply to adhere to the top ply by reason of the clinging effect of interfacial fibers is overcome by the nature of the particular contortion and lifting imparted. After thus contorting and separating the top ply, continued air flow upwardly through the device enables the separated ply to be lifted and held against the devices during removal from the stack.

As herein illustrated fluid pressure is employed for contorting the cyclic relative movement of the pick-up device, and also a pair of work releasing plungers at the desired delivery point.

BRIEF DESCRIPTION OF THE DRAWINGS

The foregoing object and other features of the invention will now be more particularly described in connection with an illustrative embodiment and with reference to the accompanying drawings thereof, in which:

FIG. 3 is a view corresponding to FIG. 1 and showing the device when it has separated a top ply;

FIG. 4 is a plan view illustrating the contortion effected in the top ply to effect separation from under plies; and FIG. 5 is an enlarged detail view in elevation showing partial penetration of only the separated top ply.

DESCRIPTION OF THE PREFERRED EMBODIMENT

Figure 1:
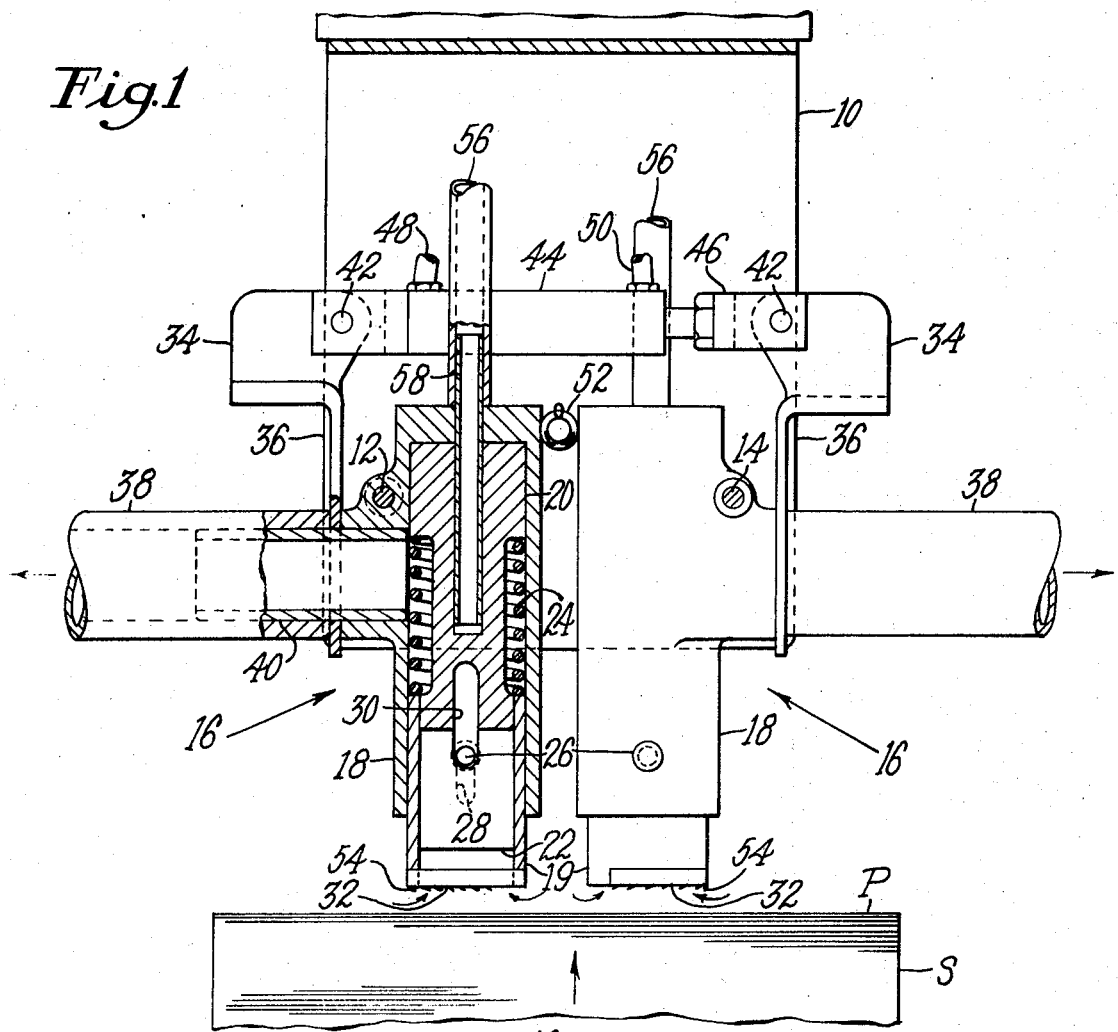
FIG. 1 is a view in side elevation, partly in section, of a pick-up device in its rest or starting position.

The invention will be explained as applied to an automatic fabric feeding machine of the general type disclosed in U.S. Pat. No. 3,531,103 issued Sept. 29, 1970, in the name of R. R. Walton, and U.S. Pat. No. 3,430,949 issued Mar. 4, 1969, in the name of D. F. Herdeg et al. It will be understood that the invention is not limited in application to any particular type of sheet handling machine.

For purposes of illustration it may be assumed that a U-shaped carrier bracket 10 (FIGS. 1–3) is mounted for lateral reciprocation between a pick off point over a stack S of fabric work pieces P to be successively transferred and a predetermined delivery position (not shown). There is pivotally connected to the bracket 10 by means of parallel fulcrum pins 12, 14 a pair of laterally offset heads generally designated 16, 16 next to be described. Each head 16 includes a cylindrical casing 18 (FIGS. 1–3) telescopically receiving tubular pick-up member 19 slidable on a piston plunger 20 having its lower end formed as a stripper 22. A radially reduced portion of the plunger 20 is fitted with a spring 24 for urging the pick-up 19 to project downwardly and outwardly from the casing 18. The extent of such projection is limited by a pin 26 extending transversely through the casing 18 and through vertical opposed slots 28 in the pick-up 19. The pin 26 also extends through a vertical slot 30 in the plunger 20 to limit its relative heightwise movement. The lower end of the pick-up 19 is tubular and carries, either around a portion of its lower rim or extending across the opening defined by its rim, a high friction means preferably in the form of an insert 32 having teeth (or card cloth) biased toward the corresponding teeth of the other pick-up head 16.

Figure 2:
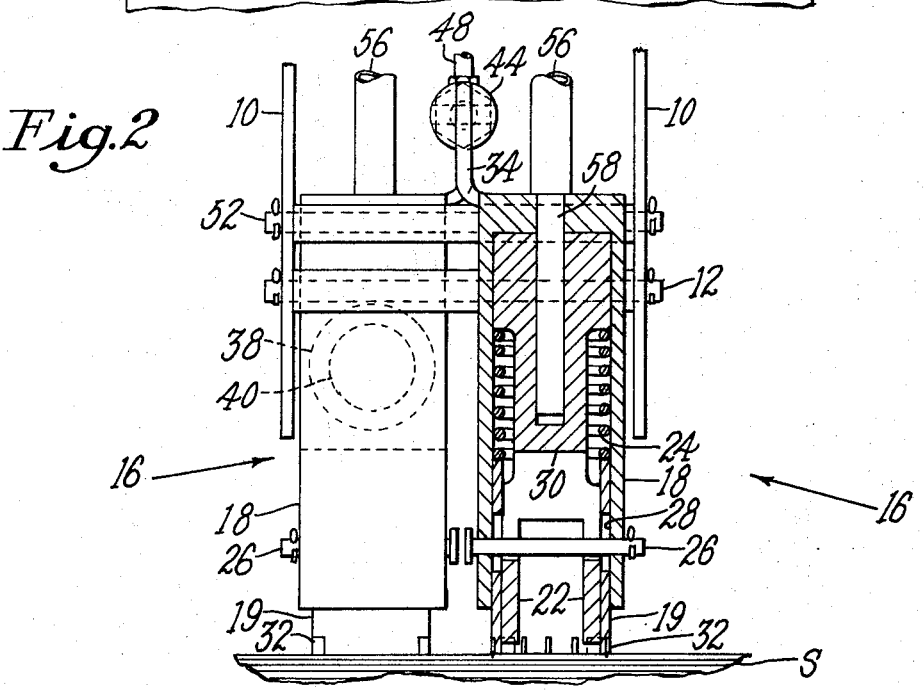
FIG. 2 is a view corresponding to a portion of FIG. 1 and looking at right angles thereto when the pick-up device and the stack are in initial engagement.

For mounting each of the heads 16 a pair of supports 34, 34 has its descending portions 36, 36 respectively arranged to secure a suction hose 38 to an outlet sleeve 40 affixed to the casing 18. The hose 38 is coupled to a suitable source of suction and is preferably continuously operable. An upper portion of the respective supports 34 is connected by a pin 42 to an operating cylinder 44 in one case and to its dual acting piston 46 in the other case. The arrangement accordingly is such that air under pressure is admitted via a line 48 to cause the heads 16 to pivot in opposite directions about the pins 12, 14, respectively, thus moving the pointed means 32 closer and upward together in their offset paths when pick up is to be executed (as indicated in FIGS. 4 and 5), and later air under pressure is admitted via a line 50 to effect return rotation of the heads 16. A rod 52 (FIGS. 1-3) secured in the bracket 10 serves as a stop for determining the initial vertical work engaging positions of the heads as shown in FIG. 1.

When employed in the automatic fabric feeder of the type disclosed in the mentioned U.S. Pat. No. 3,531,103, for example, a stack S of the fabric plies P is cyclically raised by an elevator means not herein shown to provide relative movement of approach between the top ply P of the stack and the vertically disposed heads 16, i.e., movement from the position shown in FIG. 1 to that shown in FIG. 3. The pointed means 32 accordingly yield height-wise upon initial engagement with the top ply at spaced offset localities. The line 48 is now pressurized to pivot the pointed means 32 of the heads 16 closer and upwardly as they respectively counter rotate on the horizontal axes of the rods 12, 14 which, it will be observed, are substantially vertically aligned over the remote portions or "heels" 54, 54 of the inserts 32. The pointed elements at the heel localities significantly first move tangentially, and thereafter are the last and least to be raised from the general plane of the ply P. As the pointed means 32, 32 move past one another to their "pinching positions" (FIG. 3) the ply is buckled in their locality as shown in FIGS. 3, 4 and 5 and effectively separated by contortion (perhaps accompanied by slight tensioning) so that the top ply has localized undulations separating it from the under ply. Any tendency for cleavage by interlocking of interfacial fibers is thereby disrupted in a manner that more certainly insures only the top ply will be lifted. The balanced and oppositely directed frictional movement of spaced portions of the top ply is accomplished without disturbance or distortion of the under ply. After the pair of heads 16 has thus separated the top ply, suctional air flow is effective from the hoses 38, via the slots 28, 30 to maintain the separated top ply P in engagement with the inserts 32, 32 as they transfer the work laterally to a desired delivery position. By reason of the top ply separation from the under ply the suction is not acting to lift the under ply.

The line 48 carries exhaust from the cylinder 44 as the line 50 is pressurized to return the heads 16 to parallel relation at the delivery zone and the transferred ply P is yieldingly forced from the pick-up heads at the proper moment by operating the plungers 20. This last mentioned function is accomplished by pressurizing lines 56, 56 respectively coupled to tubes 58, 58 slidably received in bores formed in the plungers 20, respectively.

From the foregoing it will be appreciated that the pick-up device is cyclically operable to transfer successive topmost plies P without disturbing the stack S or requiring a hold-down means. The high friction means 32, 32 avoid penetrating through the top ply, and contort or distort it locally and yieldingly. This is to say that the rocking motion of the high friction means enables the work piece to be safely separated and securely lifted in a manner enabling the air suction effect to hold the top sheet for its reliable removal and without disturbing the remainder of the stack.

In the event the plies P to be removed are of a larger size, obviously more than one pair of pick-up heads will be employed in unison.

Having thus described my invention what I claim as new and desire to secure by Letters Patent of the United States is:

1. A device for picking up successive single top-most plies from a stack comprising a pair of cooperative heads having their respective ply-engaging ends provided with high friction means, means mounting the heads respectively for pivotal movement about horizontal axes and in laterally offset planes between initial spaced apart ply engaging positions and closer positions whereby a localized portion of the engaged ply is contorted and lifted, said friction means being disposed transversely of said offset planes, and means for moving the heads to transfer the locally contorted ply to a delivery point where the ply may be released.

2. A device for picking up successive single top-most plies from a vertical stack comprising a pair of tubular, cooperative suction heads having their respective ply-engaging ends provided with high friction means, means mounting the heads respectively for pivotal movement about horizontal axes and in laterally offset planes between initial spaced apart ply engaging positions and closer positions whereby a localized portion of the engaged ply is contorted and lifted, said friction means being disposed transversely of said planes, and means for moving the heads to transfer the locally contorted ply to a delivery point where the ply may be released.

3. A device as set forth in claim 1 wherein the high friction means includes pointed work engaging elements yieldable heightwise, the pointed elements of one head being angularly biased toward those of the other head relatively to slide portions of the top ply on the under ply without disturbing the latter.

4. A device as set forth in claim 1 wherein each of the heads is provided with a ply stripping member, and mechanism for yieldably operating said members simultaneously at the delivery point to overcome the combined work holding effect of the suction and said friction means.

5. A device as set forth in claim 1 wherein mechanism is provided for pivoting said heads in counter rotating directions at a pick-up zone and oppositely counter rotating the heads to release the work at said delivery point.

* * * * *